United States Patent [19]

Benson

[11] Patent Number: 4,597,050

[45] Date of Patent: Jun. 24, 1986

[54] APPARATUS FOR INDICATING FLOW OF SOLID MATERIAL INTO AN EARTH MOVING DEVICE

[75] Inventor: Harvey S. Benson, San Antonio, Tex.

[73] Assignee: Southwest Research Institute, San Antonio, Tex.

[21] Appl. No.: 557,880

[22] Filed: Dec. 5, 1983

[51] Int. Cl.$^4$ ............................................. G01K 17/08
[52] U.S. Cl. ................................. 364/510; 364/562; 364/463; 73/861
[58] Field of Search ...................... 364/463, 562, 510; 165/94–97; 73/861, 9, 204, 295; 374/7; 37/DIG. 19, 109, 114, 108 R

[56] References Cited

U.S. PATENT DOCUMENTS

| 2,601,776 | 7/1952 | Frevik | 73/9 |
| 4,355,908 | 10/1982 | Weisser et al. | 73/204 |
| 4,415,279 | 11/1983 | Beuse et al. | 73/204 |

*Primary Examiner*—Errol A. Krass
*Assistant Examiner*—Thomas G. Black
*Attorney, Agent, or Firm*—Gunn, Lee & Jackson

[57] ABSTRACT

The present invention relates to the use of a solid material flow meter which utilizes a friction pad thermally connected through a thermal path of known thermal characteristics to a heat sink. Temperature sensors are positioned along the thermal path to sense the flow of heat from the friction pad to the heat sink when solid material, such as soil, is flowing in contact with the pad. An electrical signal output proportional to relative soil volume flow rate is derived from heat sensor output multiplied by depth and width of cut. The output (1) indicates when and if soil is flowing along the friction path into a bowl, and (2) indicates the optimum and unique peak rate at which it is possible for the pan scraper bowl to be loaded.

6 Claims, 6 Drawing Figures

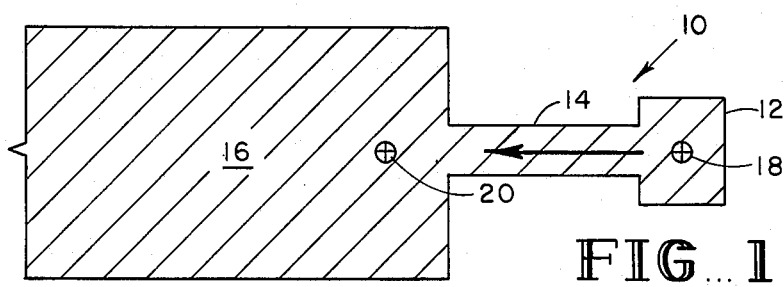
FIG_1
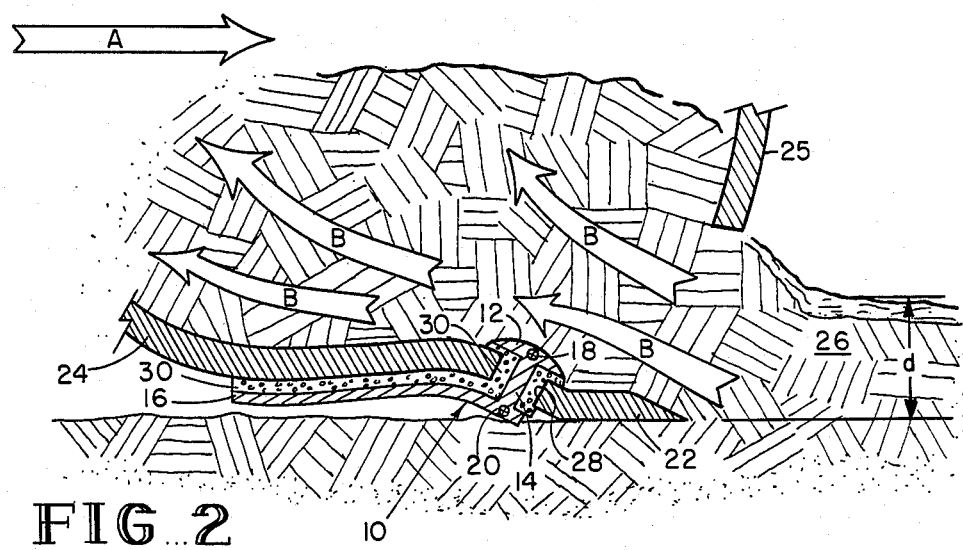
FIG_2
FIG_4
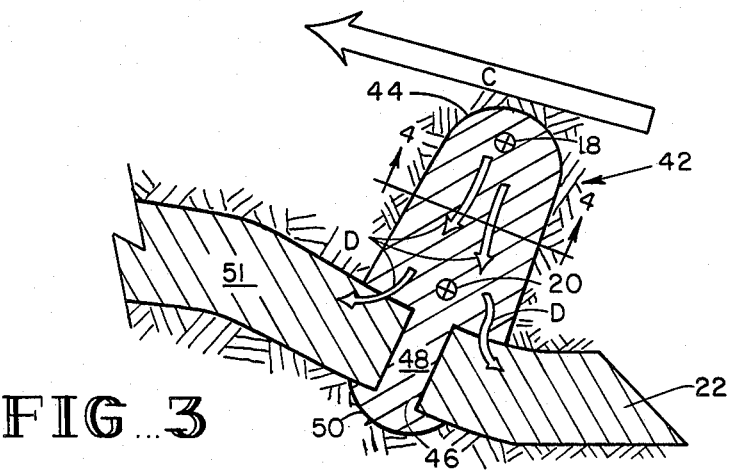
FIG_3

APPARATUS FOR INDICATING FLOW OF SOLID MATERIAL INTO AN EARTH MOVING DEVICE

BACKGROUND OF INVENTION

This invention was made under United States Government Contract Number 80292016 and the United States Government has a non-exclusive, non-transferrable, irrevocable, paid up license to practice or have practiced for or on behalf of the United States, this invention throughout the world.

The present invention relates to a new sensor to determine flow velocity of solid materials thereacross as determined by heat generated in and flowing from a friction pad. The heat flows along a predetermined thermal path to a heat sink and heat flow magnitude is measured by temperature sensors in the thermal path. More particularly, the sensor is the critical element in a flow meter used to determine when an earthmoving machine such as a pan scraper is being loaded at the maximum rate of which it is capable. In order to operate at the point of best efficiency with maximum loading rate, easily obtained depth and width of cut electrical signals are multiplied times an electrical signal proportionate to soil flow velocity rate across the friction pad of the present invention as determined by the temperature sensors to generate an output signal. When this output signal product is at its peak magnitude, the pan scraper bowl is loading at its unique maximum rate.

BRIEF DESCRIPTION OF THE PRIOR ART

In the usual and prevalent operation of devices such as earthmoving pan scrapers, there is a considerable waste of fuel energy as well as undue mechanical wear and tear on the equipment. A pan scraper has, in some periods of its loading regime, an excess of power; which excess of power enables the operator to slip the driving wheels. Such wheel slip not only abrades and damages the tires, but wastes fuel energy while doing little or nothing to increase bowl loading speed. Also, as the bowl becomes filled, the operator will generally attempt to force a soil surcharge into the bowl. Since he has no means of determining if soil is actually entering the bowl, bulldozing of soil ahead of the bowl cutting lip often occurs, again wasting fuel energy and time with attendant excess wear. The operator of the pan scraper needs to be shown (1) the instant when the pan scraper bowl is full, and (2) the maximum possible bowl loading rate. Applicant knows of no existent devices capable of furnishing the operator such information.

Because the present invention utilizes the principle of frictional heat generated within a friction pad, which heat is transferred through a thermal path to a heat sink and measured by heat sensors, U.S. Pat. No. 2,601,776 by Frevik is pointed out. Frevik simply shows thermocouples that indicate heat generated in a plow share as soil flows past the surface of the plow at a given point. However, Frevik does not have a friction pad with heat flowing along a thermal path to a dedicated heat sink with the sensors determining flow of heat along a particular thermal path. Frevik was developed to determine how to shape plow share surfaces for uniform wear without adversely affecting the share's soil working characteristics.

SUMMARY OF THE INVENTION

It is an object of the present invention to give an apparatus for indicating volume flow rate of solid material into an earth moving device.

It is another object of the present invention to give a continuous relative indication of the rate at which earth moving devices such as pan scrapers may be loaded and thereby determine the peak rate for best efficiency.

It is yet another object of the present invention to provide a simple and cost effective method of sensing the instant when the pan scraper bowl has filled and no more soil is entering the bowl.

The present invention utilizes a flow velocity sensor that has a friction pad which can be located at the cutting edge of a pan scraper bowl. As soil moves past said friction pad, frictional heat is generated and causes the temperature of the friction pad to rise. Thermodynamic law specifies that heat always flows from a hotter to a colder body, therefore said frictional heat flows along a thermal path having known thermal characteristics to a heat sink. Temperature sensors such as thermisters are located in the thermal path and sense the temperature gradient in the thermal path. Signals from the heat sensors (1) indicate when and if soil is flowing past the friction pad, and (2) give a signal proportional to soil flow velocity.

The flow velocity sensor can have any particular shape, with a couple of embodiments being shown and more fully described in the detailed description hereinbelow.

Electrical signals from the heat sensors, configured as just described, are conveniently used to derive a signal proportionate to soil flow velocity across the friction pad of the sensor described above. Further, a conventional depth of cut measuring device gives an electrical signal which indicates the depth at which the pan scraper bowl lip is cutting the soil while the soil is being loaded into the bowl. By now multiplying the depth of cut signal times the signal proportional to soil flow rate, times a constant scaling factor to account for the mechanically fixed bowl width, a product output signal proportional to the volume rate of loading of the pan scraper bowl is obtained. While the quantitative rate of loading is not known, with appropriate scaling and an operator readout device (visual or aural), peak signal output may be achieved at which time the pan scraper is being loaded at the unique maximum rate possible. If the operator manipulates the machine in such manner that the signal output is maintained at the peak, the maximum loading rate of which the pan scraper is capable is maintained, notwithstanding the fact that the scalar magnitude of that loading rate is not known. Furthermore, and most importantly, when soil stops flowing across the friction pad of the velocity sensor, the signal proportional to soil flow rate goes to zero; therefore, the output of the multiplier which gives the visual or audio indication also goes to zero. The indication denoting with exactitude the instant of bowl filling.

BRIEF DESCRIPTION OF THE DRAWINGS

FIG. 1 shows a flow velocity sensor used in the present invention, which flow velocity sensor is illustrated in its elemental form.

FIG. 2 is a pictorial, elevational, sectional illustration of a cutting edge of a pan scraper bowl in action, which cutting edge incorporates the flow velocity sensor of FIG. 1.

FIG. 3 is an alternative embodiment of a flow velocity sensor mounted adjacent the cutting edge of a pan scraper.

FIG. 4 is a cross-sectional view along section lines 4—4 of FIG. 3.

DESCRIPTION OF THE PREFERRED EMBODIMENT

Figure 5:
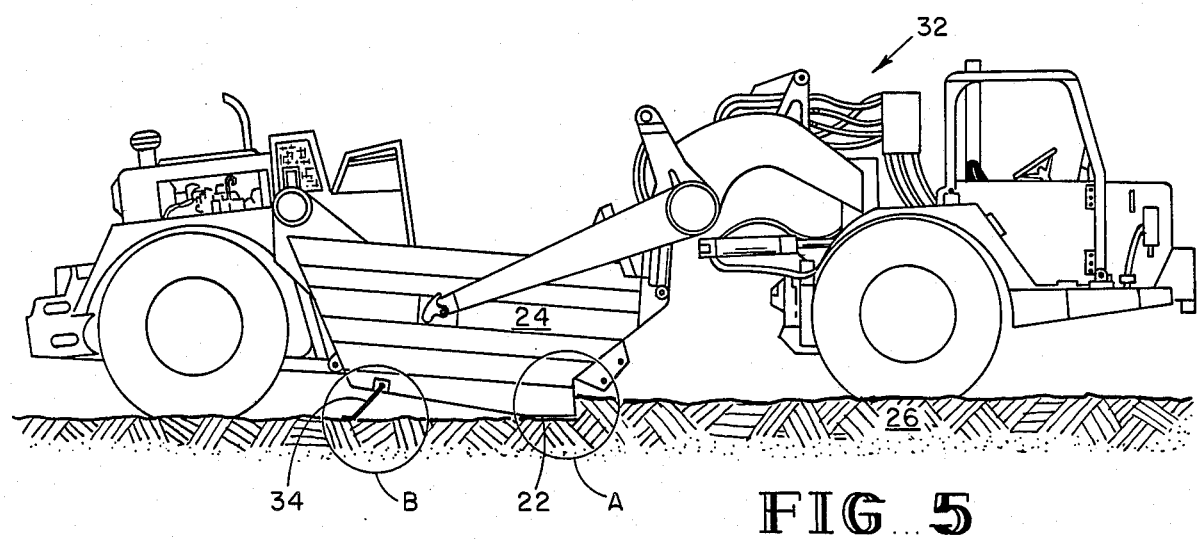
FIG. 5 is a side view elevation of a pan scraper utilizing the present invention.

Referring to FIG. 1 of the drawings, there is shown in its elemental form a flow velocity sensor represented generally by the reference numeral 10. The sensor 10 is used to determine if solid materials such as soil are flowing past friction pad means 12. If soil is flowing past friction pad 12, pad to soil friction generates heat proportional to soil velocity past the fixed friction pad 12. Heat generated in friction pad 12 flows along thermal path 14 to a heat sink 16. Heat sink 16 is designed such that it dissipates heat at a rate sufficient to always maintain its temperature well below that of friction pad means 12. Thermal path 14 has known heat transfer characteristics and as heat flows along said thermal path 14 in the direction of the arrow, temperature sensors 18 and 20 will generate electrical output signals. The temperature sensor output signals are used to determine if soil is flowing over the friction pad 12 as will be explained more fully hereinbelow. In addition, the sensors' output signals are utilized to derive an electrical signal that is proportional to the soil volume flow rate.

The temperature sensors 18 or 20 may be of any particular type with thermisters being a sensitive yet economical implementation. Installation of temperature sensors 18 and 20 may be made at the desired points in the friction pad, thermal path or heat sink by any convenient means such as drilled holes followed by encapsulation with suitable mechanical protection for the communicating electrical leads.

Referring to FIG. 2, a cutting edge 22 of a pan scraper bowl 24 is shown in usual action working at depth "d" below the terrain surface. The pan scraper bowl is moving in the direction indicated by the arrow "A". The soil 26 is being driven into the bowl 24 under the apron 25 as indicated by the arrows "B". A flow velocity sensor 10 is positioned adjacent cutting edge 22. As soil 26 moves into bowl 24, the soil 26 flows across flow velocity sensor 10. As previously described in connection with FIG. 1, the flow velocity sensor 10 of FIG. 2 has a friction pad 12, thermal path 14 and heat sink 16. The temperature sensors 18 and 20 are located in or near friction pad 12 and in or near heat sink 16 which are, respectively, the hot and cold ends of the thermal path 14. The thermal path 14 of the present flow velocity sensor 10 is located in this embodiment in a hole 28 which perforates the bowl bottom. The flow velocity sensor 10 is thermally insulated from the bowl structure with thermal insulation 30.

That portion of the flow velocity sensor 10 which includes the friction pad 12, thermal path 14 and heat sink 16 may be constructed of any particular material that is mechanically rugged and durable yet has good heat flow characteristics. A typical material that could be used is the metal beryllium copper. Other metals such as brass or even ceramic may be used. Concerning thermal insulation 30, it could typically be fiberglass laminate or any structural material with a thermal conductivity much lower than the thermal conductivity of means 12, 14 and 16 of flow velocity sensor 10. For example, beryllium copper and stainless steel might be used in a demanding application. All that is necessary is to insure that most of the heat from friction pad 12 flows along thermal path 14 to sink 16 so that the thermal gradient may be ascertained.

The temperature sensors 18 and 20 may be very tiny (1/16 inch dia.) bead type thermisters made from silicon carbide material. However, there are literally hundreds or thousands of other varieties of temperature sensors that can be used. A typical way of imbedding and making electrical connection to the heat sensors 18 and 20 would be to bore a single hole from the heat sink side of flow velocity sensor 10 and then implant in potting material the temperature sensors 18 and 20. The electrical connection leads (not shown) would then extend out the hole thence to the remainder of the invention's circuitry and be either recessed into the heat sink 16 or otherwise protected from mechanical damage by some type of armored conduit.

The underlying operating principle of the aforementioned flow velocity sensor may be elucidated as follows. Consider the elemental embodiment shown in FIG. 1. Heat sink 16 loses or dissipates heat to its surroundings in complicated ways that depend on several interrelated factors that are very difficult to calculate with precision. Fortunately, one does not need to do this in order to demonstrate that the flow velocity sensor, which is the heart of the present invention, is based on sound physical principles. Everyday experience teaches people that very hot objects lose heat to their cooler surroundings somewhat faster than do moderately hot objects; that is to say, the quantity of heat dissipated in a given time is proportional to the temperature difference. For example, if a wire is heated to red heat, it will cool to darkness rapidly if the flame is removed, and this represents a large temperature change of several hundred degrees; but, the wire is still too hot to touch and will require some time to lose heat down to a merely warm condition, even though the magnitude of this later temperature change is not nearly so great as the earlier one. A person may intentionally keep thermal path 14 small and thus limit heat flow into the larger heat sink 16; therefore, the heat sink will not change temperature very much during operation, even though friction pad 12 may reach much higher temperatures than the heat sink.

As explained earlier, the quantity of heat produced in friction pad 12 is directly proportional to the velocity of the soil in moving contact with it. Since thermal path 14 cannot remove heat from means 12 as rapidly as it is produced, the instantaneous temperature of friction pad 12 will rise to some value that is a measure of said soil velocity; and furthermore, if a person continues to measure the temperature at each end of thermal path 14 with convenient means 18 and 20, they will assuredly find the temperature at means 18 nearer the friction pad higher than that at means 20 nearer the heat sink since, as explained above, heat sink 16 stays at a more or less constant temperature. If said soil velocity decreases, then the heat input to friction pad means 12 also decreases, and the temperature difference along thermal path 14 becomes smaller because it now transports less heat flux, which action is continuously monitored by aforementioned means 18 and 20. Consider now this pivotal notion: that by correctly proportioning the heat input from means 12 and the thermal path means 14 down which it will preferentially flow to a heat sink means 16 kept at a more or less constant temperature; a person has contrived a novel arrangement capable of sensing with only a small time lag the velocity of the soil flowing past it.

Referring now to FIG. 5, the present invention is illustrated in connection with a pan scraper represented generally by reference numeral 32. A typical type of pan scraper 32 may be the Fiat - Allis 262-B tractor scraper with twin engines; however, this is only given for illustration purposes. The pan scraper 32 as shown in FIG. 5 is being used to load soil 26 into the bowl 24 with the cutting edge 22 slicing off a layer of soil 26. The flow velocity sensor 10 (previously described) is located inside of the circled area "A" and a depth of cut indicator is located inside of circled area "B". The depth of cut indicator may be of any particular configuration including a drag arm 34 connected to potentiometer (not shown) that gives an electrical signal output proportional to the depth of cut of a cutting edge 22. From the flow velocity sensor 10 (previously described), an electrical output signal is generated that is proportional to soil flow velocity across friction pad 12 (see FIG. 2).

Figure 6:
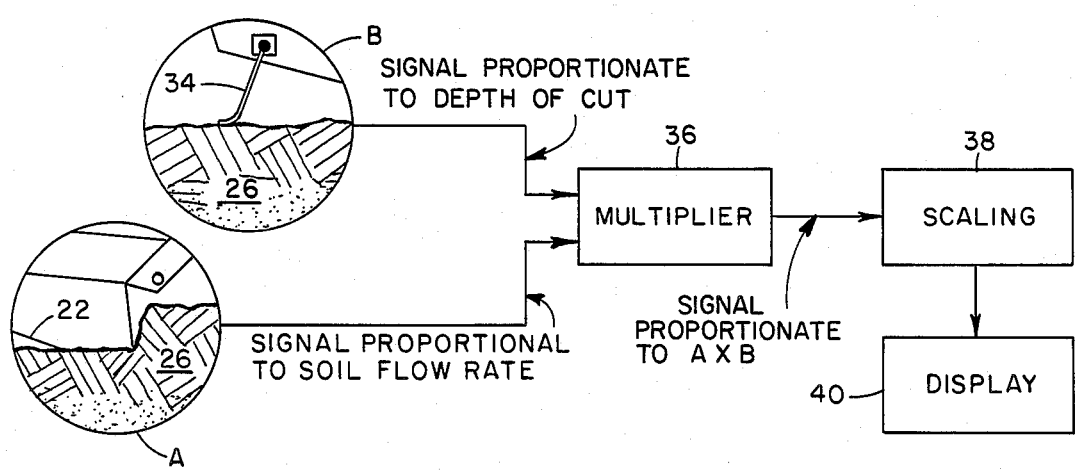
FIG. 6 is a block diagram of the present invention being used to determine if a pan scraper bowl is being loaded and to further indicate relative volume rate of loading.

Referring to FIG. 6, the electrical signals from the flow velocity sensor 10 which are proportional to soil flow velocity are fed to an electronic multiplier 36 along with the depth of cut signal generated by the drag arm 34. Because the width of cut stays constant, multiplying the depth of cut electrical signal times the soil flow velocity signal produces an output signal that is directly proportional to the relative volume loading rate of the pan scraper 32. While no scalar magnitude can be assigned to the loading rate signal, this in no way diminishes its usefulness as an aid to efficient loading procedures. The output signal may be displayed to the operator in any of a number of ways including a display 40. However, it has been found that an audible signal such as a beeper that increases in beeping frequency as the volume loading rate increases may be the desirable type of operator output display. In such case, display 40 would be replaced with a beeper with the maximum beep rate of the beeper corresponding with the maximum rate at which soil is being loaded into the bowl 24 of the pan scraper 32.

By use of the previously described flow velocity sensor 10 in conjunction with the depth of cut detection device on a pan scraper as illustrated in FIG. 5, and connected as shown in FIG. 6, an output signal is generated that (1) tells the operator of the pan scraper 32 if and when soil 26 is flowing into bowl 24, and (2) indicates the relative bowl loading rate. The first message allows the operator to be aware of the instant that bowl 24 is full and the second indication tells the operator if he is filling the bowl at the maximum rate possible. Both are important because the operator of the pan scraper 32 has only experience and limited visual cues available to help estimate the rate at which he is filling bowl 24, but the loading rate signal (provided by the present invention) indicates to the operator when he is filling the bowl 24 as fast as it can possibly be filled. This point can be made plain by referring to FIG. 6. If the operator lowers cutting edge 22 into the soil so far that the pan scraper 32 stops moving, notwithstanding that the signal from the depth indicator represented by circle "B" is then large, the indicated soil volume flow rate will be zero because the resultant zero flow velocity signal is multiplied times the depth of cut signal, and their product will be zero. Only by raising the cutting edge to allow increased velocity can the output of the multiplier increase. However, if conversely the cutting edge is now raised too high, the depth indication will go toward zero which will reduce the signal magnitude from multiplier 36 even though the soil flow rate signal is not zero.

It should be realized that other types of depth of cut indicators may be utilized and that the drag arm 34 as shown in the present invention is used solely for illustrative purposes.

Referring now to FIGS. 3 and 4 in combination, an alternative embodiment 42 of the flow velocity sensor is shown. A fin 44, which has an approximate cross section as shown in FIG. 4, is mounted in hole 46 adjcent cutting edge 22. Shank portion 48 of fin 44 extends through hole 46 and is secured therein by upset head reference numeral 50. It is important that there be good heat transfer between the fin 44 and bowl body numeral 51, which bowl body 51 now serves as the heat sink. As soil moves in the direction indicated by arrow "C", frictional heat is generated in fin 44. Heat in fin 44 flows in the direction indicated by arrows "D" to the sink bowl body 51. Temperature sensors 18 and 20 sense said heat flow as a gradient along fin 44 as represented by the arrows "D". The thermal characteristics of fin 44 are known and therefore said gradient can be used to approximate the soil flow velocity along the direction of arrow "C" past fin 44 of flow velocity sensor 42.

While the flow velocity sensor 42, as explained in conjunction with FIGS. 3 and 4, may be simpler in construction than the flow velocity sensor 10 explained in conjunction with FIG. 2, means 10 promises to be the more durable, especially in situations where soil 26 contains much rock.

The present invention provides novel means for (1) maximizing the loading rate of a conventional pan scraper 32 in all operating modes by informing the operator in real time of the optimum depth of cut, and (2) alerting the operator the moment bowl 24 has stopped filling. When material no longer enters the bowl 24 during forward motion, soil 26 is simply bulldozed ahead of bowl 24 and this action is not readily perceived by the operator. The present invention avoids the waste of both time and fuel energy because it stops the operator from proceeding in a vain attempt to load more material.

I claim:

1. An apparatus for maximizing loading rates of earth moving equipment, such as pan scrapers, comprising:
 a friction pad mounted in a bowl of said pan scraper so that material entering said bowl during loading flows over said friction pad, thereby generating frictional heat;
 a thermal path of known thermal characteristics connecting said friction pad to heat sink means to realize a thermal gradient therealong said thermal path as said frictional heat generated in said frictional pad flows to said heat sink during the time said material being loaded in said bowl flows over said frictional pad;
 temperatures sensors near each end of said thermal path for sensing said thermal gradient to give electrical output signals proportional to the magnitude of said thermal gradient; and
 indication means responsive to said electrical output signals and operable to generate an indication of optimal loading rate to inform an operator of said pan scraper that said materials are flowing into said bowl over said friction pad and to allow said operator to adjust the rate of material flow and thereby maximize said loading rate.

2. The apparatus for maximizing loading rates as recited in claim 1 further comprising:

depth of cut determining means for giving a depth of cut electrical signal proportional to how deep a lip of said pan scraper is cutting said material flowing in said bowl;

means for converting said electrical output signals to a signal proportional to material flow velocity past said friction pad; and multiplying means receiving said depth of cut electrical signal and said soil flow velocity signal and multiplying same to give a product electrical signal to said indication means, said indication means operated by said multiplied signal to give a proportional indication to the operator such that maximum loading rate into said bowl of said pan scraper may be maintained.

3. The apparatus for maximizing loading rates as recited in claim 2 including between said multiplier means and said indication means scaling means for changing said multiplied signal to a form usable by said indication means.

4. The apparatus for maximizing loading rates as recited in claim 3 wherein said indication means produces an aural output for said operator, said aural output being in a form of discrete beeps with a repetition rate of said beeps in direct proportion to said bowl loading rate.

5. The apparatus for maximizing loading rates as recited in claim 1, 2 or 3 wherein said friction pad is mounted within a wall of said bowl adjacent a cutting edge with said friction pad extending above an inner surface of said wall, said thermal path extending through a hole in said wall and said heat sink means being located outside said wall, thermal insulation means being located between said wall and said friction pad, said thermal path and said heat sink.

6. The apparatus for maximizing loading rates as recited in claim 1, 2 or 3 wherein said friction pad is fin-shaped and thermally secured to a wall adjacent a cutting edge of said bowl, said fin-shape extending into said bowl and said wall being said heat sink, said thermal path being along an axis of said fin-shape to said heat sink.

* * * * *